Sept. 9, 1969    C. W. HILBURN    3,465,620
FURNITURE JIG
Filed July 14, 1967    3 Sheets-Sheet 1
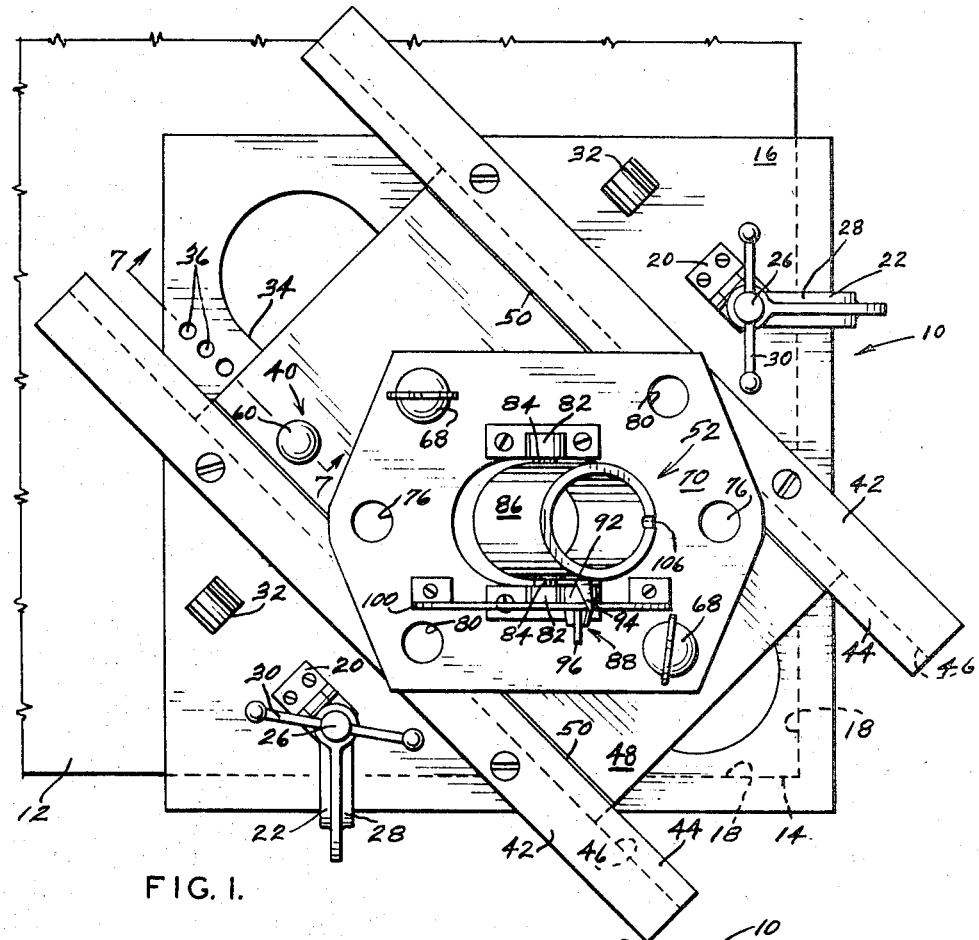
FIG. I.
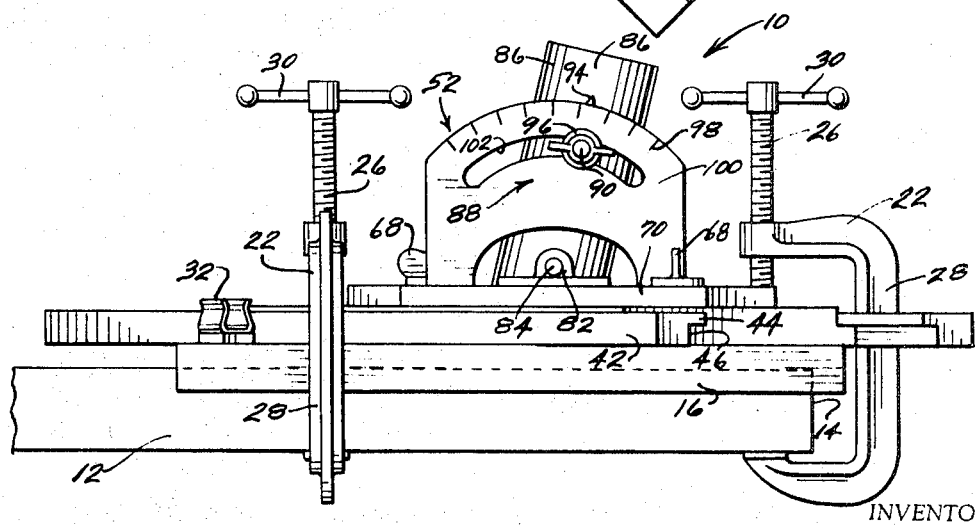
FIG. 2.
INVENTOR.
CLARENCE W. HILBURN
BY

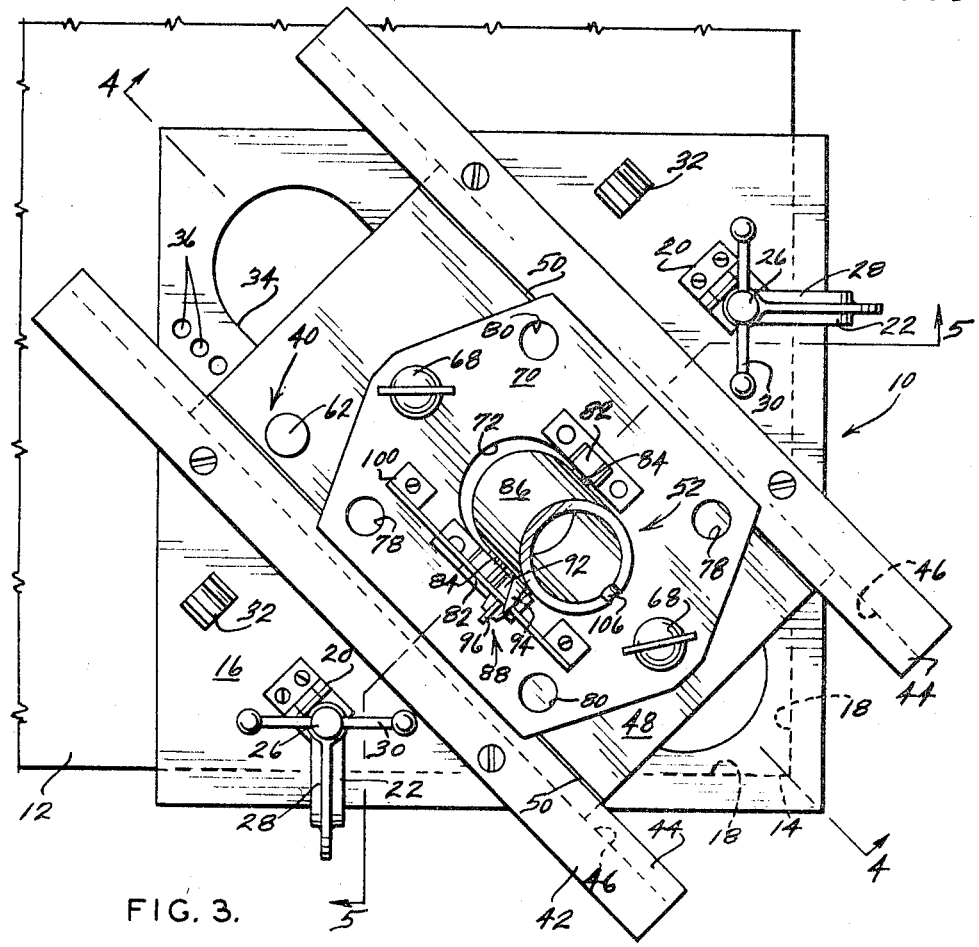

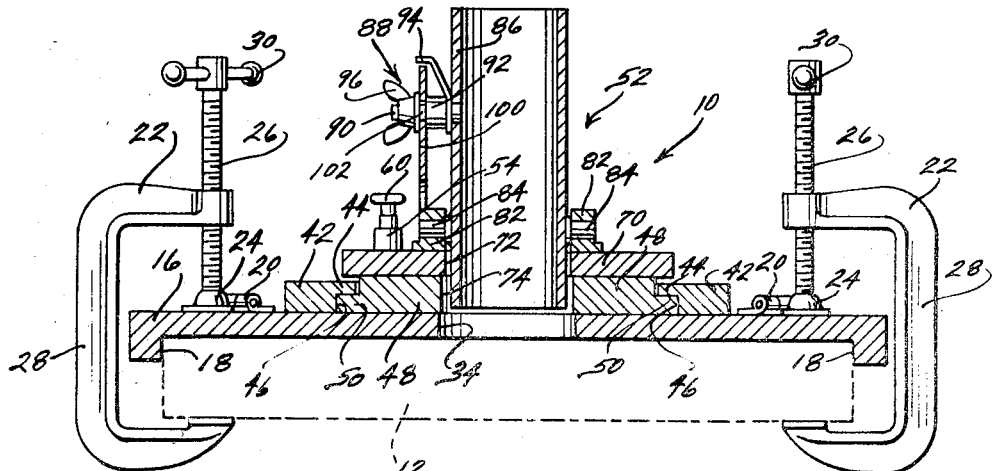

United States Patent Office 3,465,620
Patented Sept. 9, 1969

3,465,620
FURNITURE JIG
Clarence W. Hilburn, 404 W. 13th St.,
Loveland, Colo. 80537
Filed July 14, 1967, Ser. No. 653,567
Int. Cl. B23b 49/02
U.S. Cl. 77—62                              10 Claims

ABSTRACT OF THE DISCLOSURE

This disclosure relates to a jig for boring holes for furniture legs and supporting the latter while the glue sets. It comprises a bedplate releasably fastenable to the underside of a chair, table or other piece of furniture at a corner thereof. Mounted upon the bedplate are a pair of parallel diagonally-extending tracks that carry a slideblock for diagonal movement toward and away from the corner. A three-position plate releasably fastens to the slideblock and carries a tubular tool guide that is adjustably tiltable relative thereto about a horizontal axis.

Most professional cabinetmakers, carpenters and hobbyists that make furniture have at one time or another, experienced considerable difficulty in drilling holes for furniture legs at precisely the correct angle so that they match up properly and all reach the floor while maintaining the table top or chair seat in proper relation thereto. Of course, for commercial furniture manufacturers who make hundreds of like items, a permanent hole-drilling jig is a simple and practical investment; however, for the artisan who needs such a jig for only an occasional drilling job, a fixed-position unit becomes highly impractical and lacks the requisite versatility.

It has now been found in accordance with the teaching of the instant invention that a unique adjustable jig can be made that possesses the desired versatility and enables such holes to be drilled accurately and quickly in any location along a 45° line and at any angle relative thereto. Once properly set and releasably locked in position, the jig can be placed at the other corners and relied upon to guide the drill bit so as to produce additional holes having the exact same relative position and angularity. Provision is made in the tool guide for accepting the most common bit sizes and leg diameters through the use of telescoping tubular inserts. The three positions of the carrier for the tool guide enable the user to drill a vertical hole, forwardly or sidewardy inclined hole, or a diagonally inclined one.

It is, therefore, the principal object of the present invention to provide a novel and improved furniture leg jig.

A second objective is the provision of a device of the type aforementioned that will accept and guide drill bits and chair legs of various diameters.

Another object is to provide a drilling jig that can be relied upon to produce identical holes in two or more different corner positions.

Still another objective of the invention herein disclosed and claimed in the provision of a drilling jig that enables holes to be drilled at any desired angle, the axes of which lie in vertical planes extending forwardly, crosswise and diagonally relative to the workpiece.

An additional object is to provide a tool guide that can also be used to hold a furniture leg in place while glue sets.

Further objectives of the instant invention are to provide a furniture leg jig that is simple, inexpensive, easy to use, versatile, compact, lightweight, rugged, accurate and even decorative in appearance.

Other objects will be in part apparent and in part pointed out specifically hereinafter in connection with the description of the drawings that follows, and in which:

FIGURE 1 is a top plan view showing the jig fastened in place on a corner of a workpiece;

FIGURE 2 is a side elevation thereof;

FIGURE 3 is a top plan view similar to FIGURE 1 but showing the tool guide and carrier therefor shifted to drill an inclined hole on a 45° line from the corner of the workpiece;

FIGURE 4 is a section taken along line 4—4 of FIGURE 3 but showing the tool guide in vertical rather than inclined position;

FIGURE 5 is a section taken along line 5—5 of FIGURE 3 with the tool guide, once again, shifted into vertical position and the workpiece indicated in dotted lines;

FIGURE 6 is a fragmentary detail showing the retaining clips for the C-clamps and the series of adjustment holes in the bedplate alongside the tracks;

FIGURE 7 is a fragmentary section to an enlarged scale showing the spring-biased detent and adjustment holes; and FIGURE 8 is a diametrical section through the tool guide showing the removable telescoping tubular inserts that bush-down the inside diameter thereof.

Referring now to the drawings for a detailed description of the present invention and, initially, to FIGURES 1–6, inclusive, for this purpose, reference numeral 10 has been employed to designate the jig of the present invention in its entirety and reference numeral 12 the workpiece upon which it mounts. As shown, the workpiece has a square corner 14, the underside of which is to be drilled for a leg (not shown). The workpiece, of course will ordinarily comprise a table, chair, stool or similar article of furniture to be fitted with legs although it will be apparent as the description proceeds that the jig is suitable for use in drilling a hole in a precise location and at a precise angle near a corner of many other types of articles. Also, while the workpiece is illustrated as having a square corner, it is only necessary that it possess a single reasonably straight edge to employ for orientation purposes.

The jig has, as a part thereof, a bedplate 16 having a pair of ribs 18 projecting therefrom whose inside margins intersect one another at right angles as revealed most clearly in FIGURES 4 and 5. These ribs engage the corner 14 of the workpiece to which the leg is to be fastened.

At this juncture it should, perhaps, be mentioned that while the holes are customarily drilled in the underside of the workpiece, when in actual use the workpiece is turned upside down. This is the reason, of course, that the general description of FIGURES 1 and 3 referred to them as "top" rather than "bottom" plan views. Accordingly, throughout the remainder of the descriptive material, the jig will be denominated as sitting on top of the workpiece even though it sits atop the underside thereof.

Spaced inwardly of each rib on the opposite face of the bedplate therefrom and adjacent their free ends is mounted a hinge 20, one leaf of which is screwed to the bedplate while the other pivotally mounts C-clamp 22. These C-clamps are of standard design including a loose-fitting head 24 on the lower end of the screw 26, the former being welded or otherwise fastened to the hinge leaf. The screw, of course, threads through one leg of the C-shaped element 28 in the conventional manner. A handle 30 is slidably mounted in the upper extremity of the screw.

By tilting the screw into the upright position shown in FIGURES 2 and 5, it becomes possible to position the free leg of the C-shaped element underneath the workpiece. Then, by rotating the screw relative to its free turning head 24, the C-shaped element can be run up or down to releasably clamp against the workpiece. Spring clips 32 are fastened to the top of the bedplate in position to releasably latch the screw down in horizontal position as shown in FIGURE 6 which position is made possible by the hinged connection. When so latched, the C-clamps are folded out of the way for compact storage.

Extending diagonally in the bedplate at 45° from the right angle corner formed by the intersection of the ribs 18 is a wide elongate slot 34 sized to pass the largest diameter drill bit the jig is designed to accept as well as the leg to be fastened in the hole drilled by the latter. Alongside this slot in offset parallel relation thereto is provided a series of small cup-shaped depressions or sockets 36 which, as will be explained in detail presently receive the pin 38 of a spring-biased detent that has been indicated in a general way by reference numeral 40 and which is most clearly shown in FIGURE 7.

Mounted atop the bedplate are a pair of elongate undercut tracks 42 that are arranged in spaced parallel relation to one another and also to the slot 34 which they border but are spaced away from a distance sufficient to expose sockets 36 as is best revealed in FIGURES 1 and 3. Each track includes an overhanging ledge 44 that cooperates with the top surface of the bedplate to define an inwardly-facing undercut groove 46.

A slideblock 48 having tongues 50 projecting from opposite side margins thereof in position to fit into the grooves 46 in the tracks 42 is mounted for slidable movement atop the bedplate over slot 34. Moving slideblock 48 to various positions along the tracks 42 enables the tool holder subassembly which has been indicated broadly by reference numeral 52 to be located various distances from the corner. Selected positions along these tracks are maintained by releasably latching detent 40 into one of the sockets 36 in the bedplate as will now be explained in greater detail in connection with FIGURES 5 and 7 to which specific reference will now be made.

Detent 40 is illustrated in FIGURE 7 includes an inverted cup-shaped element 54 terminating in a neck 56 having an axial opening 58 therethrough. Pin 38 reciprocates vertically within the tubular neck 56 of element 54 and the handle-forming head 60 on its upper extremity limits the extent to which its lower end enters one of the sockets 36. Annular enlargement 62 carried by the pin in spaced relation above its lower end forms the movable abutment for compression spring 64, the bottom 65 of the cup-shaped depression in element 54 providing the fixed abutment therefor. Thus, raising pin 38 against the bias exerted thereon by compression spring 64 retracts said pin up into the socket in element 54 and releases the slideblock from the bedplate in the manner of most pin-type detents.

Referring next to FIGURE 4, it will also be noted that slideblock from the bedplate in the manner of most pin-threaded sleeves 66 located, in the particular form shown, on the longitudinal centerline thereof and of slot 34. These sleeves are fastened non-rotatably within the slideblock and they are designed to accept wingnuts 68 which adjustably mount the tool-holder support plate 70 atop the slideblock.

Again with reference to FIGURES 1–5, inclusive, plate 70 will be seen to include a large slightly elongated centrally-located opening 72 that registers with another such elongated opening 74 (FIGURES 4 and 5) in the slideblock while both register with slot 34 in the bedplate. Spaced equidistant on opposite sides of central opening 72 and along the longitudinal centerline of the slideblock that passes through the center of said central opening are a pair of smaller openings 76 (FIGURE 4) that receive the projecting portions of threaded sleeves 66 and position the plate such that its longitudinal centerline bisects the right angle corner formed at the juncture of the ribs 18 on the underside of the bedplate as shown in FIGURE 3. An examination of FIGURE 3 will reveal that with the tool-holder support plate positioned as shown therein, any hole drilled in the workpiece whose center line passes through the center of opening 72 will be the same perpendicular distance from the sides of said workpiece. Now, this plate 70 also includes two other pairs of openings 78 and 80. The latter pairs of openings have their centers spaced the same radial distance from the central opening 72 but along lines passing through the center thereof that lie 45° on opposite sides of the longitudinal center line of the plate. Therefore, as shown in FIGURE 1, plate 70 may be rotated 45° clockwise or counterclockwise from its FIGURE 3 position and refastened atop the slideblock 48 on sleeves 66 by means of the wingnuts 68. The reason for the adjustability of plate 70 is so that the axis of the drilled hole can either be inclined such that its axis lies in a perpendicular plane bisecting the corner of the workpiece or inclined in a perpendicular plane paralleling one side or the other thereof. The distance the hole in the workpiece lies from the corner is, of course, also variable by sliding the slideblock along its tracks and latching it in position by means of the detent 40.

Mounted atop the tool-holder support plate 70 are a pair of shaft journals 82 that receive the pins or stub shafts 84 projecting diametrically from opposite sides of tool holder 86 for pivotal movement about a transverse axis passing through the center of opening 72 that is perpendicular to the longitudinal centerline of plate 70. The tubular tool holder 86 is thus mounted for pivotal movement with its axis lying in a plane perpendicular to support plate 70, which plate also contains the longitudinal centerline of the latter element. The elongation of openings 72 and 74 along the longitudinal centerline of support plate 70 enables the drill bit guided by the tubular tool holder to reach the workpiece when said tool holder occupies an inclined position.

A lock nut subassembly that has been generally indicated by reference numeral 88 is also carried by the tool holder. Included within this subassembly 88 are a bolt 90 attached to the wall of the tool holder so as to project therefrom in spaced parallel relation above one of the stud shafts 84, a tubular spacer 92, a pointer 94 and a wingnut 96. The spacer fits over the bolt and holds the pointer 94 against the cylinder wall of the tool holder. Pointer 94 is bent outwardly into a position where the point thereof rides along arcuate scale 98 of protractor 100 which is fastened to the support plate alongside the tool holder as shown most clearly in FIGURE 2. Scale 98 is calibrated to indicate the degree of tilt of the tool holder below the vertical. Protractor 100 has an accurate slot 102 (FIGURE 2) through which the bolt 90 passes. Wingnut 96 on the bolt releasably squeezes the protractor against the spacer to hold the tool holder at any desired inclination.

Finally, with reference to FIGURE 8 it will be seen that the tool holder 86 is equipped with telescoping tubular inserts 104 that bush the internal diameter thereof down so as to accommodate smaller drill bits. In the preferred form of the invention illustrated, the tool holder 86 is notched along the top edge thereof as indicated by reference numeral 106 and the inserts 104 each carry a pin 108 that slips into the notch and keeps said insert from dropping through the bottom of the tool holder. The outside diameter of each insert is just slightly smaller than the inside diameter of the tool holder or next larger insert so that they telescope within one another with a free-sliding fit. The inside diameters are, of course, selected to accommodate standard drill bit sizes. Additional smaller inserts 104 cooperating with one another in the manner illustrated in FIGURE 8 can, of course, be used.

Having thus described the several useful and novel features of the furniture leg jig of the present invention, it will be apparent that the several worthwhile objectives for which it was developed have been achieved. Although but a single specific embodiment has been illustrated, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The adjustable drill bit jig for drilling holes adjacent the corner of a workpiece at a precise angle which comprises: a flat bedplate having perpendicularly-disposed stop-forming means projecting from the underside thereof adapted to engage a corner of the workpiece and an elongate opening whose longitudinal centerline lies along the bisector of the right angle corner formed by said stop-forming means; a pair of tracks mounted on top of the bedplate on opposite sides of the opening therein and in spaced parallel relation to its longitudinal centerline, said tracks having opposed undercut grooves formed in their adjacent edges; a slideblock having tongues on the side margins thereof that project into the grooves in the tracks and mount same for diagonal slidable movement along the longitudinal centerline of the elongate opening in the bedplate, said slideblock also having a central opening therethrough registering with the opening in the bedplate as said slideblock slides diagonally therealong; first releasable latch means interconnecting the slideblock and bedplate operative upon actuation to maintain selected adjusted positions therebetween; a tool-holder support plate having a central opening therein concentric with the central opening in the slideblock; adjusting means releasably fastening the tool-holder support plate atop the slideblock in selected rotated positions relative to the latter; a tubular tool holder mounted atop the support plate therefor for tiltable movement over the central opening therein about an axis parallel to and closely adjacent its upper face; and, second releasable latch means interconnecting the tool holder and support plate therefor operative upon actuation to maintain selected relative tilted positions therebetween.

2. The drill bit jig as set forth in claim 1 in which: clamp means are carried by the bedplate positioned and adapted for fastening same to a workpiece.

3. The drill bit jig as set forth in claim 1 in which: the perpendicularly-disposed stop-forming means on the underside of the bedplate comprise a pair of integrally-formed ribs having straight inside edges that meet one another at right angles.

4. The drill bit jig as set forth in claim 1 in which: the first releasable latch means comprises a series of holes arranged in a straight line in the bedplate paralleling the longitudinal axis of the opening therein adjacent one of the tracks, and a retractable detent mounted in the slideblock in position to enter selected openings in the bedplate.

5. The drill bit jig as set forth in claim 1 in which: the adjusting means comprises a pair of internally-threaded sleeves projecting above the surface of the slideblock located at the opposite extremities of the diameter of a circle whose center is coincident with that of the central opening therein, at least two pairs of apertures in the tool holder support plate located at opposite extremities of intersecting diameters passing through the center of the central opening therein, each pair of said apertures having a radial spacing and size adapted to receive the sleeves projecting from the slideblock in selected rotational positions of said tool holder support plate, and threaded fasteners threadable into said sleeves adapted to releasably fasten the tool holder support plate to the slideblock in any one of its rotated positions.

6. The drill bit jig as set forth in claim 1 in which: the second releasable latch means comprises: a threaded fastener projecting from the side of the tubular tool holder in spaced parallel relation above its axis of pivotal movement, an upstanding plate fastened to the tool-holder support plate alongside the tool holder in a plane substantially normal to its axis of pivotal movement, said plate having an arcuate slot therein located and shaped to receive the threaded fastener projecting from the tool holder, and a cooperating threaded member adapted to threadably connect onto the threaded fastener and releasably lock same at selected arcuate positions along the slot.

7. The drill bit jig as set forth in claim 1 in which: the tubular sleeves telescoped one inside the other to provide a series of tool guides adapted to accommodate drill bits of different sizes.

8. The drill bit jig as set forth in claim 2 in which: the clamp means comprise C-clamps hingedly attached to the bedplate for movement between an operative position adapted to be fastened underneath a workpiece and an inoperative folded position lying flat atop the bedplate.

9. The drill bit jig as set forth in claim 4 in which: the detent includes a compression spring normally biasing same into extended engaged position.

10. The furniture jig as set forth in claim 7 in which: the tubular sleeves include cooperating pins and notches adapted to interlock and prevent relative rotation therebetween.

References Cited
UNITED STATES PATENTS 2,903,920   9/1959   Blecha _____ 77—62

FRANCIS S. HUSAR, Primary Examiner

U.S. Cl. X.R.

144—93